United States Patent
Park et al.

(10) Patent No.: US 6,849,926 B2
(45) Date of Patent: Feb. 1, 2005

(54) LOW DIELECTRIC CONSTANT COMPOSITE MATERIAL CONTAINING NANO MAGNETIC PARTICLES, AND OPTICAL AND SEMICONDUCTOR DEVICES USING THE LOW DIELECTRIC CONSTANT COMPOSITE MATERIAL

(75) Inventors: Chan Eon Park, Pohang (KR); Jin Ho Kang, Seoul (KR)

(73) Assignee: Pohang University of Science and Technology Foundation, Kyungsangbuk-do (KR)

( * ) Notice: Subject to any disclaimer, the term of this patent is extended or adjusted under 35 U.S.C. 154(b) by 0 days.

(21) Appl. No.: 09/839,594

(22) Filed: Apr. 23, 2001

(65) Prior Publication Data

US 2002/0027262 A1 Mar. 7, 2002

(30) Foreign Application Priority Data

Apr. 24, 2000 (KR) .............................................. 00-21639

(51) Int. Cl.[7] .......................................... H01L 21/4763

(52) U.S. Cl. ........................ 257/642; 257/643; 257/645

(58) Field of Search .................................. 257/642, 643, 257/645; 438/778, 780, 784, 3, 651, 618

(56) References Cited

U.S. PATENT DOCUMENTS

| | | | | |
|---|---|---|---|---|
| 4,734,708 A | * | 3/1988 | Saitoh et al. | 346/74.4 |
| 5,316,699 A | * | 5/1994 | Ritter et al. | 252/584 |
| 5,582,172 A | * | 12/1996 | Papisov et al. | 600/431 |
| 5,584,146 A | * | 12/1996 | Shamouillan et al. | 51/293 |
| 5,699,842 A | * | 12/1997 | Wegman | 141/369 |
| 5,886,173 A | * | 3/1999 | Hemmi et al. | 540/472 |
| 6,063,303 A | * | 5/2000 | Ohtaki | 252/62.54 |
| 6,103,537 A | * | 8/2000 | Ullman et al. | 436/526 |
| 6,232,777 B1 | * | 5/2001 | Sato et al. | 324/252 |
| 6,294,342 B1 | * | 9/2001 | Rohr et al. | 435/7.1 |
| 6,299,716 B1 | * | 10/2001 | Bettinger | 156/85 |
| 2001/0011109 A1 | * | 8/2001 | Tomalia et al. | 523/105 |
| 2002/0028201 A1 | * | 3/2002 | Bucha et al. | 424/140.1 |
| 2002/0038582 A1 | * | 4/2002 | Holl | 75/230 |

\* cited by examiner

*Primary Examiner*—W. David Coleman
*Assistant Examiner*—Khiem Nguyen
(74) *Attorney, Agent, or Firm*—Leydig, Voit & Mayer, Ltd.

(57) ABSTRACT

A composite containing nano magnetic particles is provided. The composite includes nano magnetic particles in a dielectric matrix. The matrix is made of an inorganic material such as silica, alumina, or hydrosilsesquioxane, or an organic material such as polyimide, polymethyl methacrylate, or methyl silsesquioxane. The nano magnetic particles consist of $Fe_2O_3$, chromium oxide, europium oxide, NiZn-ferrite, MnZn-ferrite, yttrium-iron garnet, or indium In.

16 Claims, 3 Drawing Sheets

LOW DIELECTRIC CONSTANT COMPOSITE MATERIAL CONTAINING NANO MAGNETIC PARTICLES, AND OPTICAL AND SEMICONDUCTOR DEVICES USING THE LOW DIELECTRIC CONSTANT COMPOSITE MATERIAL

BACKGROUND OF THE INVENTION

1. Field of the Invention

The present invention relates to a composite employed to a semiconductor device or a display device, and more particularly, to a composite containing nano magnetic particles to exhibit such an electromagnetic characteristic as an ultra low dielectric constant.

2. Description of the Related Art

As an electromagnetic device, for example, a semiconductor device or a display device, has become highly integrated, it is necessary to employ a dielectric material having a relatively lower dielectric constant in such a device.

In more detail, in order to improve the performance of a semiconductor device or a display device or to enhance the integration level thereof, there has been a trend of sharply decreasing circuit interconnect line widths, which may increasingly bring about unacceptable interconnect resistance-capacitance (RC) delays. To solve this problem, it is required to reduce the dielectric constant of a dielectric material used as an insulating layer between interconnect lines. It is recognized that the RC delays reduce the operation speed of a semiconductor device, thus adversely affecting faster operation of the semiconductor device.

Accordingly, there have been various methods of forming an insulating layer using a dielectric material having a low dielectric constant, for example, poly(benzoxazole) having a structure similar to that of polyamide and a low dielectric constant and exhibiting a good thermal stability, as disclosed in EP 903639, EP 905170, EP 391200, EP 291779, EP 5123339, and EP 3716629. However, since poly(benzoxazole) has a poor photoactive property, it cannot be readily to be used as an interlayer dielectric (ILD) or an intermetal dielectric (IMD).

U.S. Pat. Nos. 5,114,780 and 5,115,082 disclose a dielectric material of fluorinated poly(acrylether) series, having a low dielectric constant of 2.6–2.7, which is however difficult to apply to a semiconductor manufacturing process due to its low glass transition temperature, that is, approximately 260° C. To overcome the application difficulty, an attempt to raise the glass transition temperature up to approximately 400° C. has been made. However, in this case the dielectric constant is undesirably increased to 2.8.

WO 97/10193 discloses an aromatic "SiLK" containing an orth-bisethynyl or -phenylethynyl group, exhibiting excellent thermal mechanical properties because of non-occurrence of a polar group or unsaturated structure after it is cured. However, the dielectric constant of the proposed material is kept at 2.6–2.7, and there is still a need to reduce the dielectric constant.

EP 0701283 A1 discloses a low dielectric material having a diamond-like structure of tetrahedral configuration of all carbon atoms contained therein, which is an inorganic material having excellent thermal and mechanical stability, compared to the earlier proposed low dielectric materials, which are generally organic materials having poor thermal mechanical stability. Nevertheless, in order to reduce the dielectric constant, which is still high due to the dielectric constant of diamond, that is, approximately 5.7, there has been an attempt to add hydrogen and fluorine, resulting in serious degradation of thermal stability.

U.S. Pat. Nos. 5,470,802, 5,494,858, 5,504,042, and 5,523,615 disclose methods for reducing a dielectric constant by introducing air pores (for air, k=1) into $SiO_2$ or a polymer matrix such as polyamide. However, porous dielectrics based on the methods disclosed in the referenced patents have poor mechanical properties, a high hygroscopicity due to a high surface energy and a low dielectric strength.

As an ultra low dielectric constant material having a dielectric constant of 2.5 or less has been demanded for semiconductor device manufacturing processes, it has become necessary to develop a novel ultra low dielectric constant material that has a low dielectric constant, that is excellent in thermal and mechanical properties, has a low moisture absorbance, and has a high electric strength.

SUMMARY OF THE INVENTION

To solve the above problems, it is an objective of the present invention to provide a composite having an ultra low dielectric constant which can be employed to a semiconductor device or display device.

To achieve the above objective, there is provided a composite including a dielectric matrix, and nano magnetic particles contained in the matrix.

Here, the nano magnetic particles are preferably non-spherical. Also, spherical nano magnetic particles may be added to the non-spherical nano magnetic particles. The nano magnetic particles are preferably spherical.

The matrix may be made of one selected from the group consisting of silica, alumina and hydrosilsesquioxane. Also, the matrix may be made of one selected from the group consisting of polyimide, PMMA and methyl silsesquioxane.

The nano magnetic particles are preferably superparamagnetic. Also, diamagnetic nano magnetic particles may be added to the superparamagnetic nano particles. Here, the diamagnetic nano particles may include indium (In). Also, the nano magnetic particles are preferably diamagnetic.

The nano magnetic particles may consist of ($\gamma$-$Fe_2O_3$), chromium oxide ($CrO_2$), europium oxide (EuO), NiZn-ferrite, MnZn-ferrite or Yittrium-iron garnet.

According to another aspect of the present invention, there is provided a semiconductor device including a semiconductor substrate, and an insulator made of a composite having a dielectric matrix, and nano magnetic particles contained in the matrix.

Here, the nano magnetic particles are preferably non-spherical. Alternatively, the nano magnetic particles may be spherical.

The nano magnetic particles are preferably superparamagnetic. Further, diamagnetic nano magnetic particles may be added to the superparamagnetic nano particles.

According to still another aspect of the present invention, there is provided an optical device including a transparent dielectric matrix, and a composite having nano magnetic particles contained in the matrix.

Also, the present invention provides a method for manufacturing a composite including the steps of forming nano magnetic particles, and distributing the nano magnetic particles into a dielectric matrix.

Here, the step of forming nano magnetic particles may include the steps of mixing a cation surfactant with an anion surfactant of a metal salt and subjecting the mixture to chemical sedimentation to form non-spherical nano magnetic particles.

According to the present invention, the internal electric field, which is induced by externally applied electric field, can be disturbed, thereby providing a composite having an ultra low dielectric constant.

BRIEF DESCRIPTION OF THE DRAWINGS

The above objective and advantages of the present invention will become more apparent by describing in detail a preferred embodiment thereof with reference to the attached drawings in which.

DESCRIPTION OF THE PREFERRED EMBODIMENTS

The present invention will now be described more fully hereinafter with reference to the accompanying drawings, in which preferred embodiments of the invention are shown. This invention may, however, be embodied in different forms and should not be construed as limited to the embodiments set forth herein. Rather, these embodiments are provided so that this disclosure will be thorough and complete, and will fully convey the scope of the invention to those skilled in the art. Throughout the drawings, shapes of various components are emphasized for clarity and like numbers refer to like elements.

In the preferred embodiments of the present invention, composites containing non-spherical nano magnetic particles in a matrix are provided. These composites exhibit a very low dielectric constant, compared to those having only a matrix. Electric field disturbance may occur by an internally induced electric field due to nano magnetic particles introduced into the composite. The electric field disturbance can make the composite with nano magnetic particles have a dielectric constant lower than that of the composite having only a matrix. This will be described in more detail with reference to the following embodiments.

Embodiment 1

Figure 1:
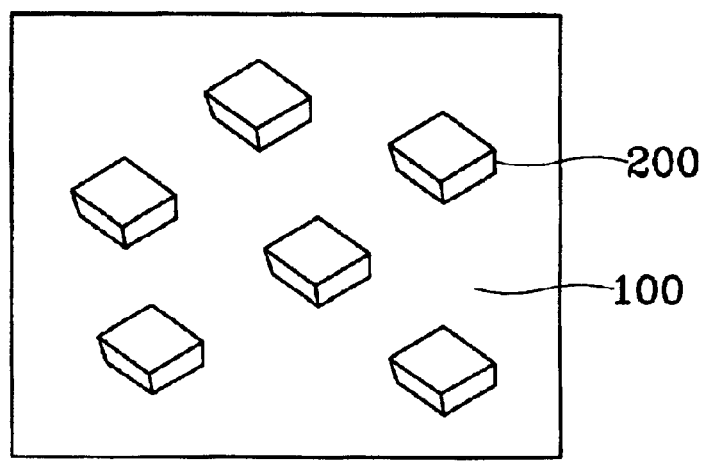
FIG. 1 is a schematic cross-sectional view for explaining a composite containing nano magnetic particles according to the present of the present invention.

FIG. 1 is a schematic cross-sectional view for explaining a composite containing nano magnetic particles according to the present of the present invention.

In detail, a composite according to a first embodiment of the present invention includes a dielectric matrix 100 and nano magnetic particles 200 distributed in the dielectric matrix 100. The nano magnetic particles 200 may be of a spherical or non-spherical shape. Specifically, the non-spherical shape, e.g., ellipsoids, needle, plate or tetrahedral, is preferred. Otherwise, spherical nano magnetic particles may be mixed with non-spherical nano magnetic particles 200.

The dielectric matrix 100 is formed of an inorganic material such as silica, alumina or hydrosilsesquioxane, or an organic material such as polyimide, epoxy, polymethylmethacrylate (PMMA) or methyl silsesquioxane.

The nano magnetic particles 200 may be formed of a superparamagnetic material including a transition metal such as cobalt (Co) or nickel (Ni) or an oxide such as γ ferrite ($\gamma$-$Fe_2O_3$), chromium oxide ($CrO_2$), europium oxide (EuO), NiZn-ferrite MnZn-ferrite, Yittrium-iron garnet, compounds of the oxides and organic compounds having the oxides, or a diamagnetic material such as indium (In). Here, a mixture of diamagnetic nano-particles and superparamagentic nano-particles may be used.

The nano magnetic particles 200 have submicrometer or nano scale, so that they do not exhibit magnetism having a crystalline anisotrophy but exhibit magnetism having a shape anisotrophy.

Figure 2:
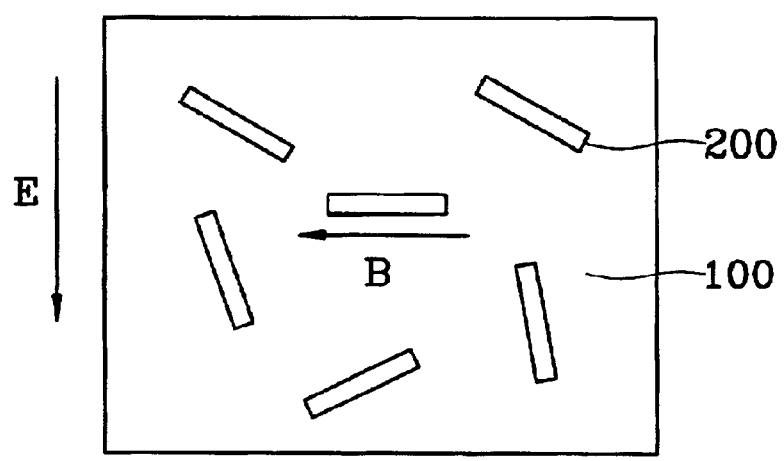
FIGS. 2 and 3 are schematic cross-sectional views for explaining the effects exerted by the present invention.
Figure 3:
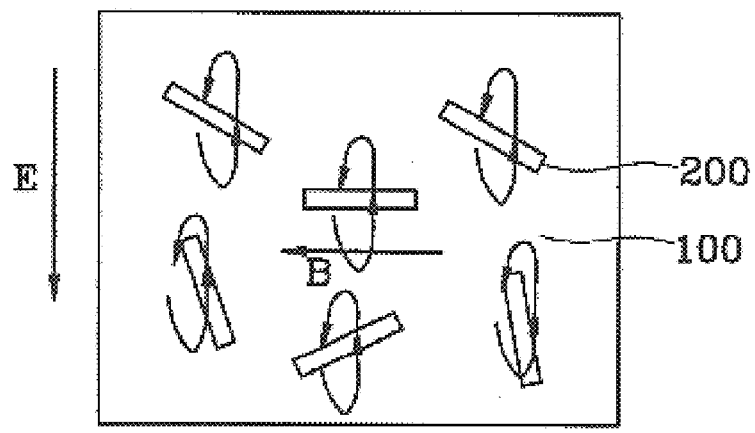

The composite having the nano magnetic particles 200 introduced into the matrix 100 exerts electromagnetic effects, as shown in FIGS. 2 and 3.

FIG. 2 is a schematic cross-sectional view for explaining the effect of generating an induced magnetic field (B) when a displacement magnetic field (E) is applied to a composite according to the present invention.

In detail, when the displacement magnetic field (E) is applied to the composite according to the present invention, the induced magnetic field (B) is generated in a direction perpendicular to the applied displacement magnetic field (E), as represented in Maxwell's Equation 4:

$$\oint B dl = (\mu_0 \varepsilon_0) \frac{d\Phi_E}{dt} + \mu_0 i$$

wherein B is a magnetic field, l is a distance, $\mu_0$ is a permitivity constant, $\varepsilon_0$ is a permeability constant, $\Phi_E$ is an electric field flux, t is a time and i is a current.

In other words, when a displacement magnetic field (E) of several hundred hertz to several gigahertz frequency, for example, is externally applied to the composite in a constant direction, the electric field flux in the interior of the composite changes, and the induced magnetic field (B) is generated perpendicular to the displacement magnetic field (E).

In more detail, the nano magnetic particles 200 are superparamagnetic, they can be magnetized by the displacement electric field (E) to be perpendicular to the displacement magnetic field (E) based on the Maxwell's Equation (4).

As the nano magnetic particles 200 are magnetized by the displacement electric field (E), the dielectric constant of the overall composite is reduced, which will now be described in detail with reference to FIG. 3.

FIG. 3 is a schematic cross-sectional view for explaining the effect of generating an induced magnetic field (E') when a displacement electric field (E) is applied to a composite according to the present invention.

In detail, referring back to FIG. 2, the flux for the induced magnetic field (B) changes by the displacement electric field (E). Accordingly, the induced electric field (E') is induced around the nano magnetic particles 200 based on the Maxwell's Equation (3) represented by:

$$\oint E dl = -\frac{d\Phi_B}{dt}$$

wherein E is an electric field, l is a distance, t is a time and $\Phi_B$ is a magnetic field flux. The induced electric field (E') is formed perpendicular to the induced magnetic field (B).

The thus-formed induced electric field (E') is formed around the nano magnetic particles 200. Since the nano magnetic particles 200 are non-spherical, the induced electric field (E') is not completely offset inside the composite, and affects externally in a direction perpendicular to the induced magnetic field (B).

The induced electric field E', to which an external electric field (E) is actually applied, disturbs the internal electric field inside of the composite. In other words, since the induced electric field (E') disturbs the internal electric field, dipole moments are not aligned in one direction, causing the composite to exhibit a low dielectric constant (∈'). On the other hand, in the case where the composite consists of only a matrix 100, the dipole moments are arranged in one direction with respect to the external magnetic field E, resulting in a higher dielectric constant (∈") than ∈'. Thus, the composite has a lower dielectric constant ∈', compared to the case where the composite has only the matrix 100.

If the introduced nano magnetic particles 200 are larger in scale than several nanometers, and do not exhibit superparamagnetism, remnant induction may be caused due to the displacement electric field. Thus, a reduction in the dielectric constant due to an electric field disturbance does not occur.

The nano magnetic particles contained in the composite according to the present invention can be prepared in the following methods to have non-spherical configurations.

EXAMPLE 1

Step 1. Synthesis of Surfactant (Salt) Having Metal Counter Ion

Nano magnetic particles were prepared by chemical sedimentation. 500 ml of 1M aqueous solution of iron (II) chloride was placed into 250 ml of 0.1M aqueous solution of sodium dodecylsulfate ($C_{12}H_{25}NaO_4S$), which is an anion surfactant, and then reacted under a nitrogen atmosphere for 12 hours. When an orange color suspension was formed, a salt was separated from the resultant by sedimentation at 2° C. The separated salt was subjected to water-washing with a 0.1 M aqueous solution of iron (II) chloride three to five times and then recrystallized in water held at 50° C., to obtain high-purity iron (II) dodecylsulfate salt ($Fe(DS)_2$). Similarly, instead of iron (II) chloride, nickel (II) chloride and zinc (II) chloride were used in the reaction to obtain a nickel (II) dodecylsulfate salt ($Ni(DS)_2$) and zinc (II) dodecylsulfate salt ($Zn(DS)_2$), respectively. The critical micelle concentrations of these salts are shown in Table 1.

TABLE 1

Critical micelle concentration of salts

| | Critical micelle concentration (mol/l) | |
|---|---|---|
| | 25° C. | 50° C. |
| NaDS | 0.08 | 0.09 |
| $Fe(DS)_2$ | 0.0014 | 0.0025 |
| $Ni(DS)_2$ | 0.0021 | 0.0025 |
| $Zn(DS)_2$ | 0.0012 | 0.0018 |

Step 2. Synthesis of Nano Magnetic Material A

A metal salt synthesized in step 1, that is, the anion surfactant, e.g., $Fe(DS)_2$, $Ni(DS)_2$, or $Zn(DS)_2$, and a cation surfactant, e.g., dodecyltrimethylammonium chloride (DTAC) were mixed in the ratio shown in Table 2,500 ml of 0.7M aqueous solution of methylamine was added thereto and then agitated violently in the presence of air for 6 hours, thereby preparing a nano magnetic material. If an anion surfactant and a cation surfactant are mixed in a predetermined ratio, the micelles are converted from spherical micelles to ellipsoidal, cylindrical, needle-like, or lamellate micelles. In such a manner ellipsoidal, disk-like, or cylindrical, i.e., non-spherical, nano magnetic particles were produced.

Figure 4:
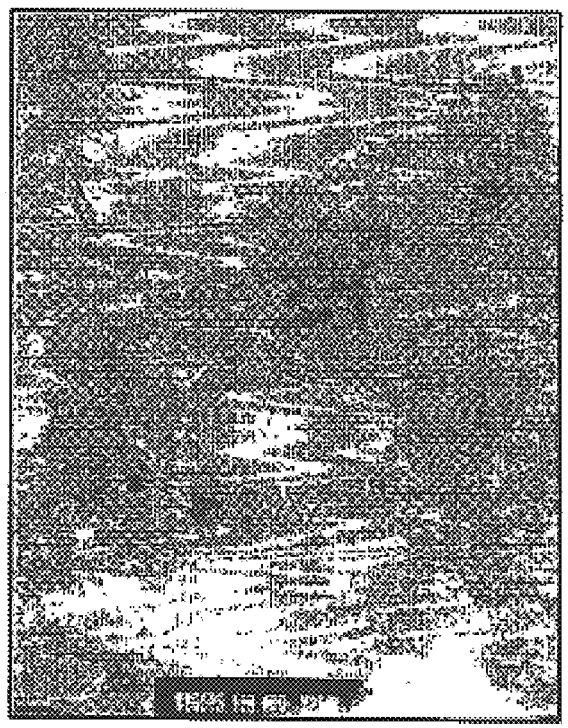
FIGS. 4 and 5 are transmission electron microscope (TEM) photomicrographs showing nano magnetic particles manufactured by the present invention.
Figure 5:
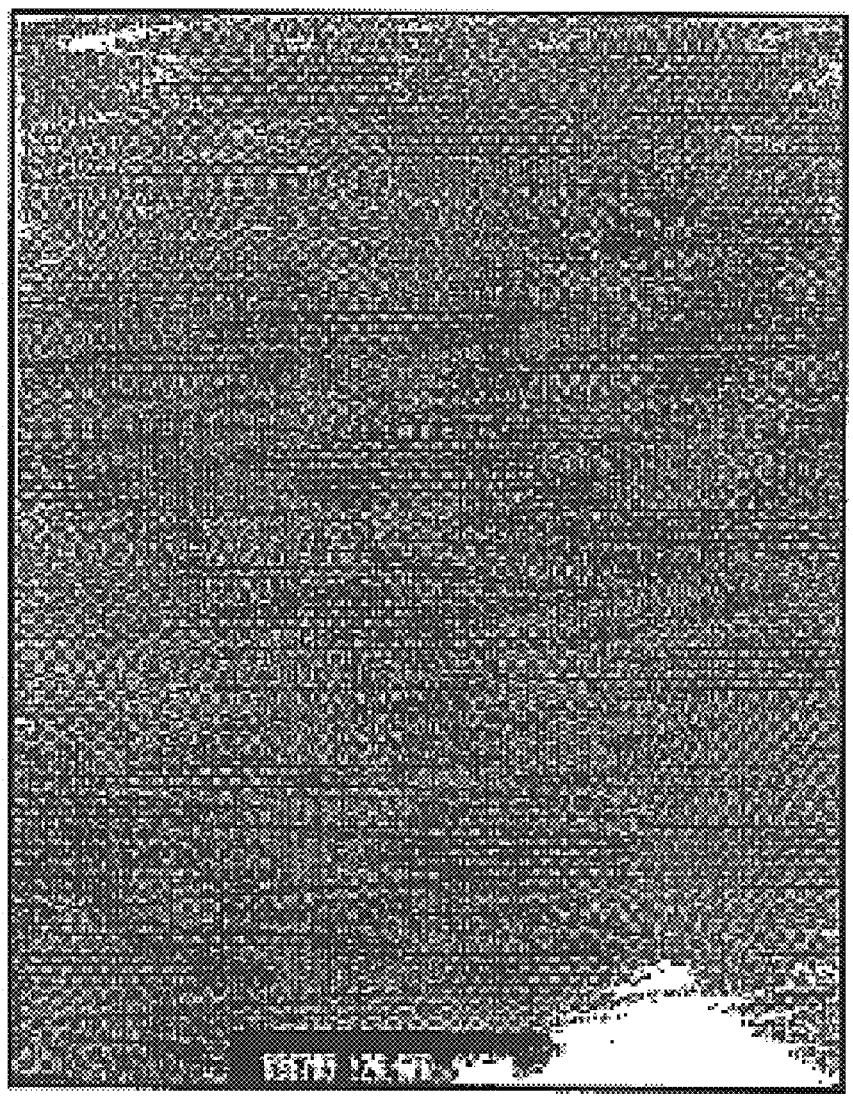

250 ml of acetone was added to the product to easily separate the nano magnetic material from the aqueous reaction solution. Acetone prevents the nano magnetic material from being dispersed in water in a stable manner, thereby separating the nano magnetic material from the aqueous solution, by centrifuging at 3000 rpm for 30 minutes. The obtained magnetic material was subjected to water-washing using 1.0M aqueous solution of nitric acid ($HNO_3$). Centrifuging and acid washing were repeatedly performed about three times. After the resultant magnetic material was dried at a 50° C. Vacuum oven for over 24 hours, its shape and size were observed by transmission electron microscopy (TEM). FIGS. 4 and 5 are TEM photomicrographs of samples A-3 and A-4 shown in Table 2, respectively. As shown in FIGS. 4 and 5, the more the cation surfactant is contained in the particles, the closer to ellipsoid or needle the particle shape is. The magnetic properties of the samples were measured by a vibrating sample magnetometer.

TABLE 2

Synthesis of $Ni_{1-x}Zn_xFe_2O_4$ nano magnetic material A

| Sample | | A-1 | A-2 | A-3 | A-4 |
|---|---|---|---|---|---|
| Reactant | Concentration (M) | Amount (ml) | | | |
| $Fe(DS)_2$ | 0.01 | 330 | 316.7 | 300 | 266.7 |
| $Ni(DS)_2$ | 0.01 | 95 | 90 | 60 | 53.3 |
| $Zn(DS)_2$ | 0.01 | 66 | 63.3 | 60 | 53.3 |
| DTAC | 0.01 | 5 | 25 | 50 | 100 |
| Methyl amine | 0.01 | 500 | 500 | 500 | 500 |
| Formula | | $Ni_{0.8}Zn_{0.2}Fe_2O_4$ | $Ni_{0.6}Zn_{0.4}Fe_2O_4$ | $Ni_{0.5}Zn_{0.5}Fe_2O_4$ | $Ni_{0.4}Zn_{0.6}Fe_2O_4$ |
| Particle diameter (TEM) | | 5.2 | 5.4 | 5.4 | 5.8 |
| Saturation inductance | | 5.8 | 6.3 | 6.2 | 5.5 |
| Remnant inductance | | zero | zero | zero | zero |
| Particle shape | | Spherical | Spherical | Spherical or ellisoidal | Spherical or ellisoidal |

Step 3. Preparation of Homogeneous Fluids of Nano Magnetic Material and Organic Solvent When the nano magnetic material prepared in step 2 is dispersed in water or an organic solvent, agglomeration occurs. Thus, nano particles should be coated using a stabilizer such as stearic acid. However, since such a stabilizer is prone to pyrolysis at high temperature, it is difficult to apply the stabilize to a high-temperature resistant polymer such as polyimide. Thus, in the present invention, the nano particles are washed with acid without using a stabilizer, so as to make the nano particles surface-charged, thereby leading to stable dispersion.

0.005 g of particles obtained in the first centrifuging in step 2 was dissolved in 4.995 g of water to obtain an aqueous solution having a pH of approximately 11. To the obtained solution was added 0.5 ml of 0.1M aqueous nitric acid and subjected to two times-washing with water, producing a nano magnetic solution of a 6–7 pH, followed by centrifuging, dissolution in an organic solvent, e.g., anhydrous N-methyl pyrrolidone (NMP). Then, the surfaces of the nano particles are positively charged, and orange-color, transparent magnetic fluids, as shown in Table 3 are obtained.

TABLE 3

Nano magnetic fluids

| Sample | Magnetic particles | | Organic solvent | | Concentration of magnetic particles (M) |
|---|---|---|---|---|---|
| | Type | Amount (g) | Type | Amount (g) | |
| AN-1 | A-1 | 0.01 | NMP | 9.99 | 0.1 |
| AN-2 | A-2 | 0.01 | NMP | 9.99 | 0.1 |
| AN-3 | A-3 | 0.01 | NMP | 9.99 | 0.1 |
| AN-4 | A-4 | 0.01 | NMP | 9.99 | 0.1 |

Step 4. Synthesis of Nano Magnetic Particle/Hydrosilsesquioxane (HSQ) Composite

The nano particles processed in steps 2 and 3 were applied to an HSQ matrix to make a composite. The HSQ used as the matrix was 18 wt % dissolved in methylisobutyl ketone. The nano magnetic fluids prepared in step 3 were mixed with an HSQ solution, in the mixing ratio as proposed in Table 4. The obtained nano magnetic particle/HSQ composite was spin-coated on a p-type silicon wafer having aluminum coated by thermal evaporation, at 2000 rpm for 60 seconds, and then cured. The curing condition was such that the temperatures was elevated to 150° C., 200° C. and 350° C. step by step at a speed of 5° C./min, each step having a dwell time of 1 minute. The temperature was elevated to 400° C. and then a dwell time of 1 hour was provided for curing, followed by natural cooling. Then, aluminum was deposited by thermal evaporation in the same manner as above to fabricate an electrode, and then a flat-panel capacitor. The dielectric constant of the resultant was measured using a Keithyey CV analyzer (see Table 4). As shown in Table 4, while the dielectric constant of HSQ without magnetic particles is 3.07 (2V, 1 MHz), the dielectric constants of NC-H1, NC-H2 and NC-H3 containing spherical nano particles AN-1, AN-2 and AN-3, respectively, are higher than 3.07. The dielectric constant of NC-H4 containing ellisoidal or needle-like nano particles is reduced to 2.62.

TABLE 4

Nano magnetic particle/hydrosilsesquioxane (HSQ) composite

| Sample | Mixing ratio | | Magnetic particle contents in HSQ (wt %) | Dielectric constant (2 V, 1 MHz) | Leakage current (pA) |
|---|---|---|---|---|---|
| | Nano magnetic fluids (g) AN series | Polymer matrix (g) HSQ | | | |
| NC-H1 | AN-1 1 | 1 | 0.55 | 3.28 | 0.28 |
| NC-H2 | AN-2 1 | 1 | 0.55 | 3.29 | 0.20 |
| NC-H3 | AN-3 1 | 1 | 0.55 | 3.10 | 0.23 |
| NC-H4 | AN-4 1 | 1 | 0.55 | 2.62 | 0.08 |
| NC-H5 | 0 | 1 | 0 | 3.07 | 0.33 |

EXAMPLE 2

Synthesis of Nano Magnetic Particle/Polyimide (PI) Composite

The nano magnetic particles prepared in steps 2 and 3 of Example 1 were unformly dispersed in a PI matrix to form a nano composite. The PI used as the matrix was prepared in the following manner and its physical properties were then measured.

To 115.97 g of anhydrous n-methyl-pyrrolidone (NMP) were added 6.37 g (0.029 mol) of 1,2,4,5-benzenetetracarboxylic acid (pyromellitic dianhydride (PDMA)), 11.50 g (0.036 mol) of 3,3',4,4'-benzophenone tetracarboxylic dianhydride (BTDA), 13.00 g (0.065 mol) of 4,4'-diaminodiphenylether (ODA), and mixed at 10° C. under a nitrogen atmosphere for 6 hours, to polymerize polyamic acid having 20% solid content. The reactants used are ones that are commercially available. NMP was added to the polyamic acid having 20% solid content to prepare polyamic acids having 2%, 5% and 10% solid contents, respectively.

After polymerization, the higher viscosity of the polyamic acid was reduced to 20000 to 30000 cps, which is low enough for film casting. Film casting was performed on a slide glass by a spin-on method, 1 hour pre-baking was performed, and the temperatures were elevated step by step to 150° C., 200° C. and 350° C. at speeds of 5° C./min, 5° C./min and 2° C./min, respectively, each step having a dwell time of 1 hour, for imidization, followed by natural cooling, thereby acquiring a desired film. The components of the acquired film are shown in Table 5.

The thickness of the acquired film was 40 μm, and mechanical properties thereof were evaluated with ASTM D882 manufactured by Instron. The tensile strength of the film was evaluated by measurement of elongation percentage at a break point, stress at the break point, and Young's modules. The thermal properties of the film were evaluated by measurement of glass transition temperate and thermal degradation temperature. The measurement results are shown in Table 6.

TABLE 5

Polyimide (PI)

| Sample | Composition (%) | | | Solid matter content (%) |
|---|---|---|---|---|
| | PMDA | BTDA | ODA | |
| PI-1 | 45 | 55 | 100 | 2 |
| PI-2 | 45 | 55 | 100 | 5 |
| PI-3 | 45 | 55 | 100 | 10 |
| PI-4 | 45 | 55 | 100 | 20 |

TABLE 6

Physical properties of polyamide

| | | Example |
|---|---|---|
| Component | Amine (mol %) | ODA (100) |
| | Anhydride (mol %) | BTDA (55)/ |
| | | PMDA (45) |
| Tensile strength | Elongation at breaking point (%) | 20.1 |
| | Stress at breaking point | 126.13 |
| | Young's modulus (GPa) | 3.21 |
| Thermal properties | Glass transition temperature (° C.) | 291 |
| | Thermal degradation temperature (° C.) | 525.7 |

The nano magnetic particle/PI composites were prepared using the matrix of PI having the above described properties. The nano magnetic fluid having 0.1 wt % solid content, prepared in step 3 of Example 1 and polyamic acid prepared in Example 2 were mixed in the ratio shown in Table 7, to prepare nano magnetic particle/polyamic acid, which was spin-coated at 2000 rpm for 60 seconds, 1 hour pre-baking was performed, and the temperatures were elevated step by step to 150° C., 200° C. and 300° C. at speeds of 5° C./min, 5° C./min and 2° C./min, each step having a dwell time of 1 hour, for imidization. Then, aluminum was deposited by thermal evaporation in the same manner as above to fabricate an electrode, and then a flat-panel capacitor. The dielectric constant of the resultant was measured using a Keithly CV analyzer (see Table 7). As shown in Table 7, while the dielectric constant of pure polyamide is 3.15, the dielectric constants of NC-3 containing 0.55 wt % nano particles with respect to PI is reduced to 2.51.

TABLE 7

Nano magnetic fluid/polyamide (PI) composite materials

| | Mixing ratio | | | Magnetic particle contents in PI (wt %) | Dielectric constant (2 V, 1 MHz) | Leakage current (pA) |
|---|---|---|---|---|---|---|
| Sample | Nano magnetic fluids BN-4 (g) | Polymer matrix PI (g) | Solvent NMP (g) | | | |
| NC-1 | 1 | PI-1 1 | 0 | 4.8 | 3.32 | 0.20 |
| NC-2 | 1 | PI-2 1 | 0 | 0.99 | 2.68 | 0.37 |
| NC-3 | 1 | PI-3 0.5525 | 0.4475 | 0.55 | 2.51 | 0.37 |
| NC-4 | 0 | PI-4 2 | 0 | 0 | 3.15 | 0.16 |

As described above, since the composite according to the present invention exhibits a lower dielectric constant, it can be advantageously used as an insulator for a semiconductor device or display device. For example, after interconnections are formed on a semiconductor substrate, the composite can be used as an insulator to cover the interconnections.

Therefore, RC delays due to a reduced interconnection line-width can be effectively suppressed by employing the composite having a low dielectric material used as the insulator for insulating interconnections formed on the semiconductor substrate. Also, since the composite includes a matrix having nano magnetic particles, several problems with conventional porous dielectric materials, such as poor mechanical and electrical properties or a higher tendency of absorbing moisture, can be overcome.

Further, inductance, which may be caused when the clock speed of a semiconductor chip is several giga hertz or higher, can be reduced by adding a diamagnetic material such as indium (In).

Embodiment 2

When a matrix 100 itself is highly transparent, for example, PMMA, HSQ or methylsilsesquioxane, the composite according to the present invention also exhibit a high transparency. Since nano magnetic particles 200 have a nano scale, the transparency of the matrix 100 is not lowered.

Therefore, when the matrix 100 has a higher transparency, the composite according to the present invention can be applied to optical devices such as optical lenses.

In general, a refractive index is defined by $n_{21}=\sin\theta_1/\sin\theta_2$. Here, $\theta_1$ is an angle of incidence of incident rays and $\theta_2$ is an angle of refraction of refracted rays. For a given refractive index (n) in vacuum, for simplicity, n=c/v where c is the speed of light in vacuum and v is the speed of light in the medium, $n^2=\in\mu$ (where, $\in$ is the dielectric constant and $\mu$ is permitivity. The dielectric constant of the composite according to the present invention can vary by an externally applied electric field (E). This is mainly because the nano magnetic particles 200 introduced into the composite are superparamagnetic. The magnetization degree of a superparamagnetic material is changed according to the intensity and frequency of the external electric field (E). Thus, as the intensity and frequency of the external magnetic field (E) are changed, the dielectric constant of the composite according to the present invention can be changed.

Therefore, in an optical device including an electric field generating means for applying an electric field to an optical lens manufactured using the composite according to the present invention, the refractive index and focal distance of the optical lens can be adjusted by varying the electric field applied to the optical lens.

While the present invention has been described in conjunction with the preferred embodiments disclosed, the invention is not limited thereto and additional modifications and changes will readily occur to one skilled in the art within the scope and spirit of the invention being indicated by the following claims.

What is claimed is:

1. A composite comprising:
    a layer of a dielectric material having a thickness, as a matrix of the composite, wherein the matrix is selected from the group consisting of hydrosilsesquioxane, polyimide, polymethyl methacrylate, and methyl silsesquioxane; and
    superparamagnetic nano-particles having a maximum dimension of 5.8 nm and dispersed throughout the matrix, wherein superparamagnetic nano-particles are selected from the group consisting of chromium oxide, europium oxide, NiZn-ferrite, MnZn-ferrite, and yttrium-iron garnet.

2. The composite according to claim 1 wherein the superparamagnetic nano-particles are non-spherical.

3. The composite according to claim 2, including spherical superparamagnetic nano-particles in addition to the non-spherical superparamagnetic nano-particles.

4. The composite according to claim 1, including diamagnetic nano-particles in addition to the superparamagnetic nano-particles.

5. The composite according to claim 4, wherein the diamagnetic nano-particles include indium.

6. The composite according to claim 1, wherein the superparamagnetic nano-particles are spherical.

7. The composite according to claim 1, wherein the thickness of the dielectric material is at least one thousand times the maximum dimension of the superparamagnetic nano-particles.

8. A semiconductor device comprising:
    a semiconductor substrate: and
    an insulator disposed on the semiconductor substrate and comprising a composite including a layer of a dielectric material having a thickness, as a matrix of the insulator, wherein the matrix is selected from the group consisting of hydrosilsesquioxane, polyimide, polymethyl methacrylate, and methyl silsesquioxane; and superparamagnetic nano-particles having a maximum dimension of 5.8 nm and dispersed throughout the matrix, wherein the superparamagnetic nano-particles are selected from the group consisting of chromium oxide, europium oxide, NiZn-ferrite, MnZn-ferrite, and yttrium-iron garnet.

9. The semiconductor device according to claim 8, wherein the superparamagnetic nano-particles are non-spherical.

10. The semiconductor device according to claim 8, including diamagnetic nano-particles.

11. The semiconductor device according to claim 8, wherein the superparamagnetic nano-particles are spherical.

12. The semiconductor device according to claim 8, wherein the thickness of the dielectric material is at least one thousand times the maximum dimension of the superparamagnetic nano-particles.

13. An optical device comprising:

a layer of a transparent dielectric material having a thickness, as a matrix, wherein the matrix is selected from the group consisting of hydrosilsesquioxane, polyimide, polymethyl methacrylate, and methyl silsesquioxane; and superparamagnetic nano-particles having a maximum dimension of 5.8 nm and dispersed throughout the matrix, wherein the superparamagnetic nano-particles are selected from the group consisting of chromium oxide, europium oxide, NiZn-ferrite, MnZn-ferrite, and yttrium-iron garnet.

14. The optical device according to claim 13, wherein the superparamagnetic nano-particles are non-spherical.

15. The optical device according to claim 13, wherein the superparamagnetic nano-particles are spherical.

16. The optical device according to claim 13, wherein the thickness of the dielectric material is at least one thousand times the maximum dimension of the superparamagnetic nano-particles.

\* \* \* \* \*